US012621713B2

(12) United States Patent
de Lepinau

(10) Patent No.: US 12,621,713 B2
(45) Date of Patent: May 5, 2026

(54) METHOD OF COMMUNICATION BETWEEN A PEER AND A SIGNALING SYSTEM

(71) Applicant: STREAMROOT, Paris (FR)

(72) Inventor: Erwan de Lepinau, Paris (FR)

(73) Assignee: STREAMROOT, Paris (FR)

( * ) Notice: Subject to any disclaimer, the term of this patent is extended or adjusted under 35 U.S.C. 154(b) by 277 days.

(21) Appl. No.: 18/506,700

(22) Filed: Nov. 10, 2023

(65) Prior Publication Data

US 2024/0298214 A1     Sep. 5, 2024

(30) Foreign Application Priority Data

Mar. 2, 2023    (EP) ..................................... 23305276

(51) Int. Cl.
H04W 28/08        (2023.01)
H04L 5/00         (2006.01)

(52) U.S. Cl.
CPC ........... H04W 28/08 (2013.01); H04L 5/0044 (2013.01)

(58) Field of Classification Search
None
See application file for complete search history.

(56) References Cited

U.S. PATENT DOCUMENTS

| | | | |
|---|---|---|---|
| 8,095,614 B2 * | 1/2012 | Hopkins ............... | H04L 67/104 |
| | | | 370/254 |
| 2004/0054807 A1 * | 3/2004 | Harvey ................... | H04L 45/00 |
| | | | 709/239 |
| 2005/0086288 A1 * | 4/2005 | Datta .................... | H04L 67/104 |
| | | | 709/201 |
| 2009/0113253 A1 * | 4/2009 | Wang ................. | H04L 67/1008 |
| | | | 709/227 |
| 2011/0255675 A1 | 10/2011 | Jasper et al. | |
| 2015/0006611 A1 | 1/2015 | Johnston et al. | |

(Continued)

OTHER PUBLICATIONS

European Search Report for EP Application No. 23305276.0 mailed Jun. 26, 2023 (5 pages).

*Primary Examiner* — Jamaal Henson

(57)                ABSTRACT

A method comprising: obtaining (102) a dataset consisting of respective unique identifiers of signaling instances present in a system at a first time; obtaining (104) a unique identifier of a peer of a peer-to-peer network; selecting (106) a first signaling instance among the signaling instances, by applying a deterministic function (F) to input data comprising the unique identifier and the dataset; establishing (108) a communication channel comprising a subchannel between a load balancer (L) and the peer and a subchannel between the load balancer (L) and the first signaling instance; obtaining (102) an updated dataset consisting of respective unique identifiers of signaling instances present in the system (1) at a second time; selecting (106) a second signaling instance among the signaling instances, by applying the deterministic function (F) to updated input data, wherein the updated input data comprises the unique identifier and the updated dataset; if the second signaling instance differs from the first signaling instance, updating (109) the communication channel by closing the subchannel between the load balancer (L) and the first signaling instance and opening a subchannel between the load balancer (L) and the second signaling instance.

6 Claims, 4 Drawing Sheets

(56) References Cited

U.S. PATENT DOCUMENTS

| | | | | |
|---|---|---|---|---|
| 2015/0113154 A1* | 4/2015 | Nguyen | ................. | H04L 67/51 |
| | | | | 709/228 |
| 2016/0205518 A1* | 7/2016 | Patel | ................... | G06F 9/45558 |
| | | | | 455/518 |
| 2018/0006952 A1 | 1/2018 | Nakaura et al. | | |
| 2018/0091215 A1* | 3/2018 | Yang | ...................... | H04B 7/155 |
| 2018/0309636 A1* | 10/2018 | Strom | ..................... | H04L 43/08 |
| 2018/0375907 A1* | 12/2018 | Ivov | ......................... | H04N 7/15 |
| 2019/0289042 A1* | 9/2019 | Perreault | .............. | H04L 67/141 |

* cited by examiner

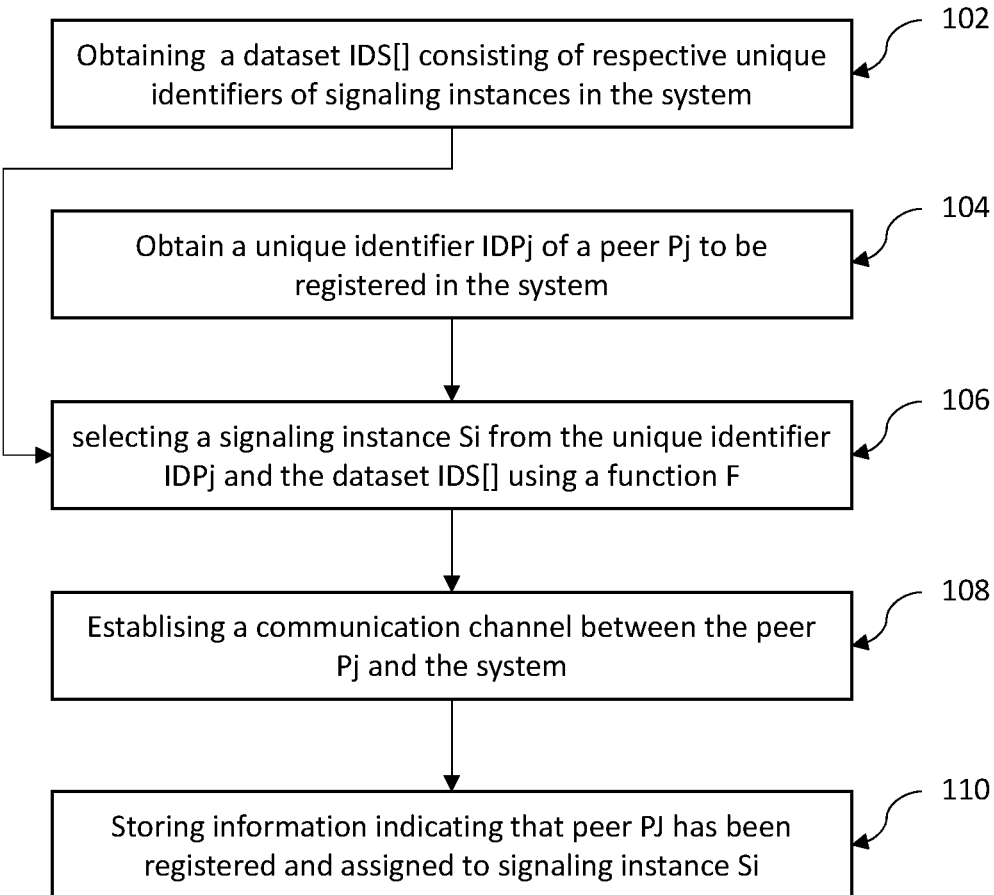

Obtaining a dataset IDS[] consisting of respective unique identifiers of signaling instances in the system    102

Obtain a unique identifier IDPj of a peer Pj to be registered in the system    104 selecting a signaling instance Si from the unique identifier IDPj and the dataset IDS[] using a function F    106

Establising a communication channel between the peer Pj and the system    108

Storing information indicating that peer PJ has been registered and assigned to signaling instance Si    110

FIG. 2

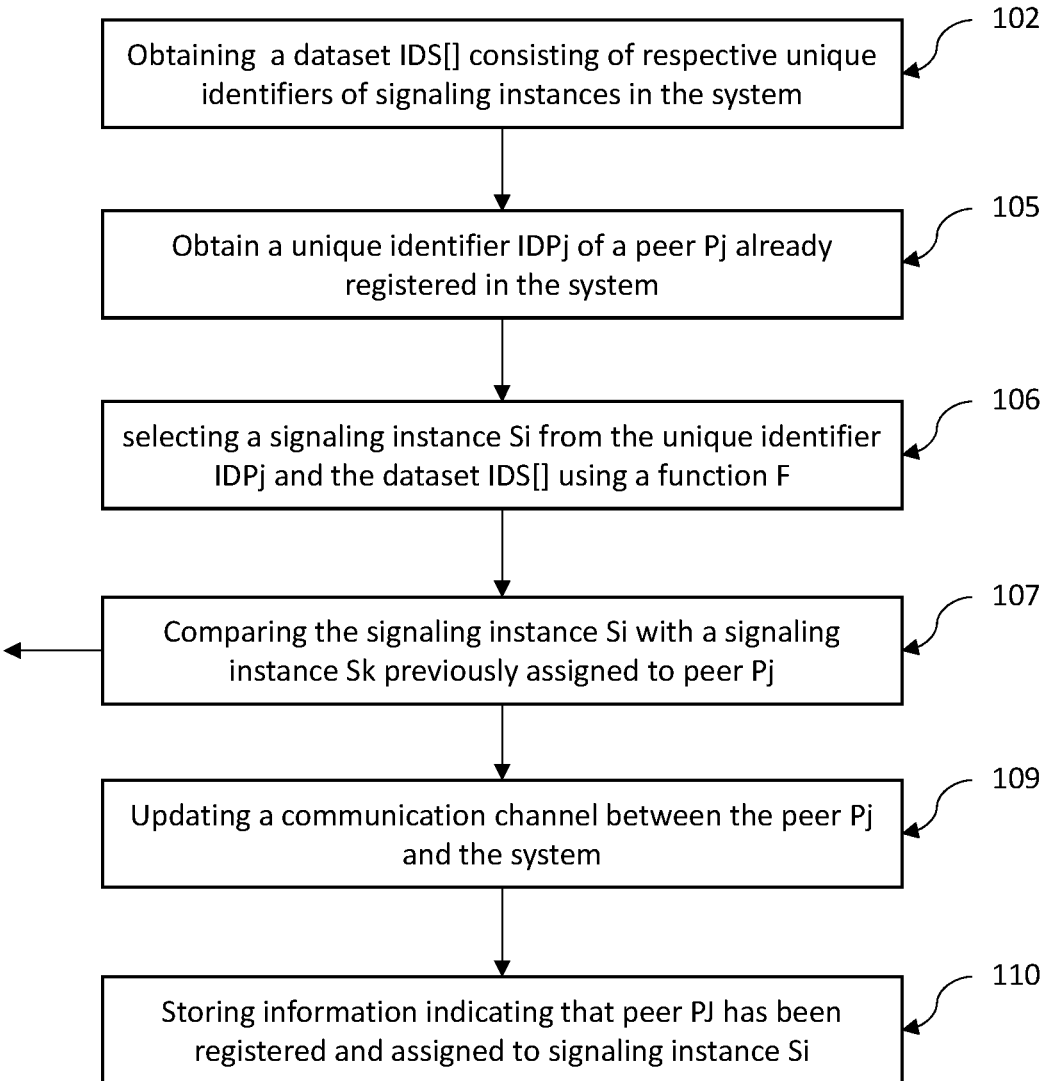

Obtaining a dataset IDS[] consisting of respective unique identifiers of signaling instances in the system          102

Obtain a unique identifier IDPj of a peer Pj already registered in the system          105 selecting a signaling instance Si from the unique identifier IDPj and the dataset IDS[] using a function F          106

Comparing the signaling instance Si with a signaling instance Sk previously assigned to peer Pj          107

Updating a communication channel between the peer Pj and the system          109

Storing information indicating that peer PJ has been registered and assigned to signaling instance Si          110

FIG. 3

METHOD OF COMMUNICATION BETWEEN A PEER AND A SIGNALING SYSTEM

CROSS-REFERENCE TO THE RELATED APPLICATIONS

This application claims the benefit of Application No. 23305276.0 filed Mar. 2, 2023, in Europe, and which application is incorporated herein by reference. To the extent appropriate a claim of priority is made to the above-disclosed application.

TECHNICAL FIELD

The present disclosure deals with a method of communication between a peer and a signaling system.

BACKGROUND

A system for relaying messages between peers of a peer-to-peer network comprises several signaling instances, wherein the signaling instances communicate with peers via different communication channels. In practice, a peer may be assigned to a specific signaling instance.

Such a system works as follows. A message generated by a source peer and intended for a recipient is received by a first peer of the system, via a first communication channel established between the source peer and the first signaling instance. Then, the message is sent by a second signaling instance of the system to the recipient peer via a second communication channel established between the second signaling instance and the recipient peer.

It may be desirable to change the number of signaling instances in the signaling system. However, this change may cause issues preventing a message to find its way within the signaling system.

SUMMARY

A goal of the present disclosure is to overcome the drawback identified above.

This goal is achieved by the method of claim 1. This method comprises steps of:

obtaining a dataset consisting of respective unique identifiers of signaling instances present in a system at a first time, obtaining a unique identifier of a peer of a peer-to-peer network, selecting a first signaling instance among the signaling instances, by applying a deterministic function to input data, wherein the input data comprises:

the unique identifier of the peer, and the dataset, establishing a communication channel between the peer and the system, wherein the communication channel comprises a subchannel between a load balancer and the peer and a subchannel between the load balancer and the first signaling instance, obtaining an updated dataset consisting of respective unique identifiers of signaling instances present in the system at a second time after the first time, wherein the updated dataset differs at least in part from the dataset, selecting a second signaling instance among the signaling instances, by applying the deterministic function to updated input data, wherein the updated input data comprises:

the unique identifier of the peer, and the updated dataset, comparing the first signaling instance and the second signaling instance, if the second signaling instance differs from the first signaling instance, updating the communication channel, where the updating comprises:

closing the subchannel between the load balancer and the first signaling instance, and opening a subchannel between the load balancer and the second signaling instance.

Optional features of the method and other aspects of the present disclosure are detailed in the other claims.

Optionally, each subchannel is a Websocket channel.

Optionally, the deterministic function is a rendezvous hashing or a consistent hashing.

Optionally, the deterministic function outputs a unique identifier of the selected signaling instance.

Optionally, the input data consists of the unique identifier of the recipient peer and of the dataset.

Another aspect of the present disclosure is a computer program product comprising instructions which, when the program is executed by a computer, cause the computer to carry out the steps of the method described above.

A further aspect of the present disclosure is a non-transitory computer-readable medium comprising code instructions for causing a computer to perform the method described above.

A further aspect of the present disclosure is a load balancer configured to perform the method described above.

Still another aspect of the present disclosure is a system comprising the load balancer and an instance manager configured to add at least two signaling instances in the system, and send the dataset to the load balancer.

DESCRIPTION OF THE DRAWINGS

The above and other objects, features and advantages of this invention will be apparent in the following detailed description of an illustrative embodiment thereof, which is to be read in connection with the accompanying drawings.

FIGS. 2, 3, 4 shows steps of methods according to an embodiment, and performed in a signaling system.

DETAILED DESCRIPTION OF A PREFERRED EMBODIMENT

Figure 1:
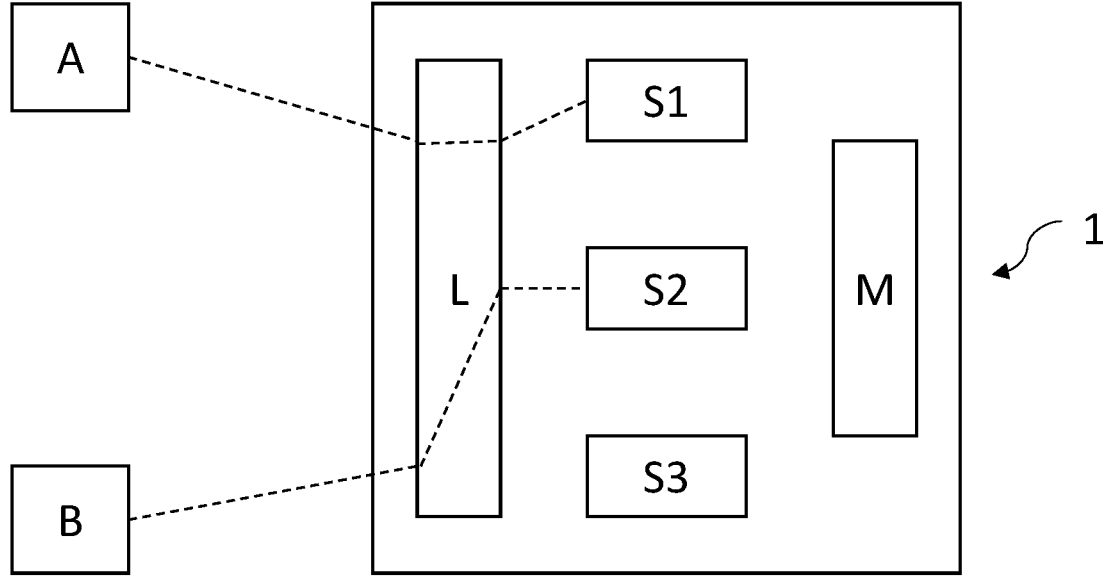
FIG. 1 schematically represents peers of a peer-to-peer network and a signaling system for relaying messages between the peers.
Figure 4:
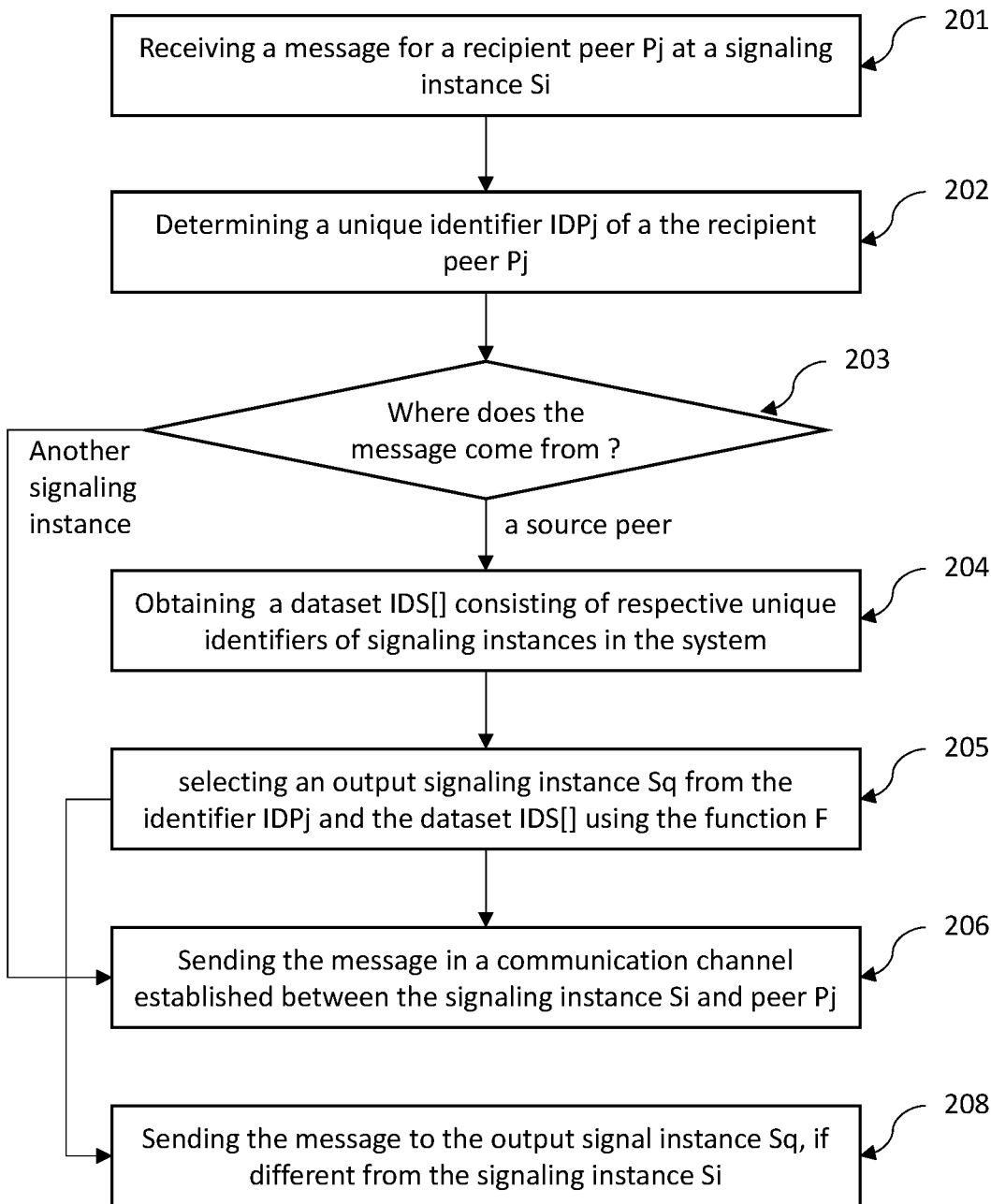

A signaling system 1 according to an embodiment is shown in FIG. 1.

A function played by the signaling system 1 is relaying messages between peers of a peer-to-peer network. In the non-limiting example of FIG. 1, only two peers A, B are shown, but the signaling system 1 is of course able to communicate with more peers.

The signaling system 1 comprises server resources for performing methods that will be described later. Said server resources comprise processors and memories. The server resources may be of any type. In practice, the server resources may comprise a plurality of physical servers having the ability to communicate with each other. Each physical server comprises a processor, said processor comprising one or many cores. Each core can perform tasks, and different cores may perform different tasks in parallel. In practice a server resource may comprise physical resources of a single server, such as one or many cores, or physical resources of many physical servers.

The signaling system 1 comprises an instance manager M. The instance manager M comprises a processor configured to execute code instructions of an instance management program, and a memory. The memory of the instance manager M may store the load instance management computer program and other data.

The instance manager M has the ability to add or remove signaling instances in the signaling system 1.

A "cloud computing instance" is commonly defined in the literature as a server resource configured to perform tasks. In the present disclosure, a "signaling instance" is defined as a server resource of the signaling system 1 configured to execute code instructions of a signaling computer program. When executed by a signaling instance, the signaling computer program causes the signaling instance to perform a signaling method which will be described later.

The exemplary signaling system 1 shown in FIG. 1 has three signaling instances S1, S2, S3.

However, the number of signaling instances may be different. In addition, the number of signaling instances of the system 1 can vary over time.

Different signaling instances Si, Sj involve different server resources of the signaling system 1. More particularly, different signaling instances may be run by different physical servers or by different cores of the same server.

The signaling system 1 further comprises a load balancer L. The load balancer L has the ability to establish communication channels between peers and signaling instances, for instance Websocket communication channels. The load balancer L acts as a proxy between the signaling instance and peers, for example as a layer 7 proxy in the sense of the OSI model.

The load balancer L comprises a processor configured to execute code instructions of a load balancing computer program, and a memory. The memory of the load balancer may store the load balancing computer program and other data.

A common feature between the load balancing computer program to be executed by the load balancer L and the signaling computer program to be executed by each signaling instance Si is a predefined deterministic function F.

This function F is deterministic in so far as it involves no randomness. The deterministic function F computes output data from input data. If the input data does not change, the output data will not change either.

Generally speaking, the deterministic function F is expected to select a signaling instance of the signaling system 1 from a unique identifier of a peer and from a dataset y[ ] representing a particular context. The deterministic function F represents an assignment of the peer to the selected instance in said context.

The deterministic function F is designed to be used as follows:

$$F(x, y[]) = z$$

wherein:
- x is a unique identifier of a peer allowing the peer to be distinguished from other peers,
- y[ ] is a set of unique identifiers of signaling instances (this set has a variable number of elements)
- z is a unique identifier of a signaling instance output by the function F.

A particular property of the deterministic function F is that the output z is always an element of the dataset y[ ].

Preferably, another property of the deterministic function F is a tendency to assign peers to different instances evenly. Let us assume that the variable x can have N different values. Now, let us suppose that the function is executed N times. Each execution of the function f takes as input data a different value of x but a constant set Y[ ] having M elements. The N executions produce N values of z wherein each of the M elements will tend to appear N/M times. The "rendezvous hashing" and the "consistent hashing" are two examples of deterministic functions having this interesting property, and which can therefore be included in the function F or used as function F.

Instance Management

When executed by the instance manager M, the instance management program causes the instance manager M to perform a method comprising the following steps.

At some point, the instance manager M detects that at least one first predefined condition is fulfilled. For instance, a first condition may be an average CPU usage of existing signaling instances exceeding a certain threshold.

Upon detecting that at least one first predefined condition is fulfilled, the instance manager M adds at least one new signaling instance Si, thereby increasing the number of signaling instances present in the system 1. Adding a new signaling instance comprises finding an unused server resource of the system 1, and configuring this server resource so as to make it perform a signaling method which will be described hereinafter.

For each newly added signaling instance Si, the instance manager obtains an unique identifier IDSi of the new signaling instance Si and adds it in a dataset IDS[ ], said dataset being stored in a memory of the instance manager M.

The unique identifier IDSi of signaling instance Si may for example be an address of the signaling instance Si, such as an IP address thereof.

Whenever detected that at least one second predefined condition is fulfilled, the instance manager M removes at least one signaling instance Si (which has been previously added), thereby decreasing the number of signaling instances present in the system 1. Removing a signaling instance comprises stopping or interrupting the signaling method, and marking the server resource assigned to the signaling instance as free. From this point on, this server resource is no longer used, and can be reused in the future by the instance manager M to add a new signaling instance.

Furthermore, the instance manager M removes the unique identifier of each freed signaling instance from the dataset IDS[ ] of instances stored in the memory of the instance manager M.

In other words, the dataset IDS[ ] is updated so as to reflect the signaling instances present in the signaling system 1 at any time.

The instance manager M repeatedly sends the dataset IDS[ ] to each signaling instance and to the load balancer L, preferably periodically, for example every 5 seconds.

Load Balancing

When executed by the load balancer L, the load balancing computer program causes the load balancer L to perform a load balancing method.

In reference with FIG. 2, the load balancing method comprises the following steps.

In step 102, the load balancer L obtains a dataset IDS[ ] consisting of respective unique identifiers of signaling instances present in the signaling system 1, and sent by the instance manager (since said instances have been added by the instance manager M).

In step 104, the load balancer L obtains a unique identifier IDPj of a peer Pj which needs to be registered in the signaling system 1. The load balancer L considers that a peer Pj needs to be registered when the load balancer L receives a registration request sent by the peer Pj (the unique identifier IDPj may be included in the registration request).

The unique identifier IDPj of a peer Pj may for example be an address of the peer Pj, such as an IP address thereof.

Steps 102 and 104 may be performed in any order.

In step 106, the load balancer L selects a signaling instance Si among signaling instances, by applying the deterministic function F to the unique identifier IDPj of the peer Pj obtained at step 104, and to the dataset IDS[ ] received at step 102. The function F actually outputs the unique identifier IDSi of the signaling instance Si, thereby selecting said instance Si. It can also be considered that F actually "assigns" the peer Pj to the signaling instance Si.

Step 106 may be triggered in different manners. In an embodiment, step 106 is performed upon obtaining the unique identifier IDPj, and the dataset IDS[ ] used in step 106 is the last dataset received by the load balancer. This dataset may have been obtained by the load balancer before obtaining the unique identifier IDPj, and even before receiving a request of registration of peer Pj. In another embodiment, such a registration is received, then the load balancer waits for a new dataset IDS[ ], then triggers step 106 upon receiving this new dataset IDS[ ]. This illustrates the fact that steps 102 and steps 104 are prerequisites for conducting step 106, which may occur in any order.

In step 108, the load balancer L establishes a communication channel between the peer Pj and the signaling system 1. The communication channel may be bidirectional.

The main purpose of the communication channel is conveying messages from the signaling system 1 to the peer Pj (considered as a recipient of said messages). The communication channel may be also used for conveying messages from the peer Pj (considered as a source of said messages) to the signaling system 1.

The communication channel actually comprises two subchannels arranged in series: an external subchannel between the peer Pj and the load balancer L, and an internal subchannel between the load balancer L and the signaling instance Si identified by the deterministic function F. The subchannel between the load balancer L and signaling instance is called "internal" because the load balancer L and the signaling instance are parts of the signaling system 1. In contrast, the subchannel established between the load balancer L and the peers Pj is called an "external" channel to illustrate the fact that the peer Pj is not part of the signaling system 1. The two subchannels may be Websocket channels, especially if the standard web-compliant protocols are used.

In step 110, the load balancer L stores in a memory thereof information indicating that the peer Pj has been registered and assigned to the signaling instance Si selected by means of the function F. In practice, the load balancer L may store the unique identifier IDSj in association with the unique identifier IDPj of peer Pj in its memory. Such an association may for instance be obtained by a hashmap.

The load balancer L may create as many internal subchannels to a signaling instance Si as there are peers registered to that instance. For instance, if both peers A and B were registered to S1, the load balancer L would have 2 internal subchannels to instance S1 (one for each peer). L choose not to reuse a single internal channel for multiple peers, even if they are registered to the same instance.

The steps shown in FIG. 2 and discussed above address the case wherein a new peer is to be registered in the system.

Now, we will discuss further steps of the load balancing method in reference to FIG. 3.

As explained before, the load balancer L obtains the dataset IDS[ ] at step 102.

Upon obtaining the dataset IDS[ ], the load balancer triggers a step 105 wherein the load balancer L obtains the unique identifier IDPj of any peer already registered in the system 1. For that purpose, the load balancer L searches in its memory any information indicating that a peer has been registered and assigned to a signaling instance.

If at least one registered peer is detected at step 105, the load balancer L performs the steps below for each registered peer Pj. From this point on, we assume that a peer Pj has been assigned to signaling instance Sk.

Step 106 is performed for the peer Pj as explained before, based on the dataset IDS[ ] obtained at step 102 and based on the unique identifier IDPj found at step 105. The function F outputs signaling instance Si, as explained before.

In step 107, the load balancer L compares the signaling instance Si identified using the deterministic function F with the signaling instance Sk which was previously assigned to the peer Pj.

If Si=Sk, then the load balancer L updates the communication channel between the peer Pj and the signaling system 1 in step 109. This update comprises closing the internal subchannel previously added between the load balancer L and the signaling instance Sk, and opening a subchannel between the load balancer L and the signaling instance Si identified by the deterministic function F.

Then the load balancer L performs step 110, i.e. stores in the memory thereof information indicating that the peer Pj has been registered and assigned to the signaling instance Si selected by means of the function F.

If Si=Sk, the update step 109 is bypassed and the method repeats step 106 for any other peer already registered. If there is no registered peer left, the load balancer waits for receiving another dataset IDS[ ].

Now, let us illustrate the load balancing method described above by an example. In a first iteration of the method, the load balancer L receives the dataset IDS[ ]=[IDS1, IDS2], meaning that two signaling instances S1, S2 have been added by the instance manager M in the signaling system 1. In this first iteration, the load balancer L detects that no peer has been registered so far, and detects that two peers A, B are to be registered. The unique identifier of peer A is IDPA, and the unique identifier of peer B is IDPB.

In the first iteration of the method, the function F is executed two times, and may for instance yield the following results:

$$F(IDPA, [IDS1, IDS2]) = IDS1$$

$$F(IDPB, [IDS1, IDS2]) = IDS2$$

In this example, the deterministic function F has assigned peer A to instance S1, and has assigned peer B to instance S2. As a result, a first communication channel is established between peer A and the signaling instance S1, and a second communication channel is established between peer B and the signaling instance S2 during the first iteration of the load balancing method.

Now, suppose that the instance manager M decides later to add a third signaling instance S3 in the signaling system 1. The instance manager M sends to the load balancer L an updated dataset IDS[ ]=[IDS1, IDS2, IDS3], thereby triggering a second iteration of the load balancing method. For the sake of simplicity, we assume that the load balancer L does not detect any new peer to be registered in this second iteration. The function F is executed two times, and may for instance yield to the following results:

$$F(IDPA, [IDS1, IDS2, IDS3]) = IDS1$$

$$F(IDPB, [IDS1, IDS2, IDS3]) = IDS3$$

In this example, the function F has assigned peer A to instance S1, and has assigned peer B to instance S3, which is different from instance S2. As a result, the first communication channel established between peer A and the signaling instance S1 is left as it is, and the second communication channel established between peer B and the signaling system 1 is updated at the second iteration, by closing the internal subchannel between the load balancer L and the signaling instance S2, and opening an internal subchannel between the load balancer L and the signaling instance S3.

Message Signaling Between Peers Using the Signaling System 1

The signaling system 1 may be used for relaying messages between registered peers.

As explained before, any signaling instance Si added in the signaling system 1 is configured to perform a signaling method. This signaling method comprises the following steps shown in FIG. 3.

In step 201, the signaling instance Si receives a message initially generated by a source peer. The message is intended for a recipient peer Pj. The message may comprise the unique identifier IDPj of the recipient peer Pj.

In step 202, the signaling instance Si determines the unique identifier IDPj of the recipient peer Pj based on the message it has received. If the unique identifier IDPj is included in the message, the first signaling instance S1 parses the message to extract it.

In step 204, the signaling instance Si obtains the dataset IDS[ ] indicating the signaling instances added in the signaling system 1, like in the step 102 performed by the load balancer L.

It is to be noted that steps 201, 202, 204 may be performed in any order.

In step 203, the signaling instance Si checks where the message comes from. The message may either come from a communication channel established between the source peer and the signaling instance Si or from another channel established between the signaling instance Si and another signaling instance of the signaling system 1.

If the message comes from a communication channel established between the source peer and the signaling instance Si, this means that the message has just entered the signaling system 1. In other words, the signaling instance Si is the very first instance of the system 1 that has received the message. In this case, the signaling method goes to step 204.

If the message comes from another instance of the system 1, then the signaling method goes to step 206.

In step 205, the signaling instance Si selects an output signaling instance Sq among the signaling instances of the signaling system 1, by applying the deterministic function F to the unique identifier IDPj of the recipient peer Pj and to the received dataset IDS[ ].

The output signaling instance Sq is either the first input signaling instance Si or another signaling instance of the signaling system 1.

If the output signaling instance Sq selected by the signaling instance Si using the deterministic function F is the first signaling instance Si (Sq=Si), then the signaling method goes to step 206. If the output signaling instance Sq is not the signaling instance Si (Sq=Si), the signaling method goes to step 208.

In step 206, the signaling instance Si directly sends the message in a communication channel previously established between the signaling instance Si and the recipient peer Pj, without involving any further signaling instance of the system 1.

In step 208, the signaling instance Si sends the message to the output signaling instance Sq using internal communication means of the signaling system 1. This internal communication means may for instance be a network request using the HTTP protocol.

Preferably, the signaling instance Si determines whether the output signaling instance Sq is the first signaling instance or not before executing the function F at step 205. This piece of information may be obtained by checking whether the unique identifier of the recipient peer is present in a data structure specific to the first signaling instance, and wherein peers assigned to the signaling instance Si are listed. The data structure may be of any type: a list, hashset or hashmap, etc. If the recipient peer is found in the data structure, then the method may directly jump to step 206. If the recipient peer is not found in the data structure, then step 205 is performed.

To illustrate the benefits of the signaling method described above, let us consider a non-limiting case wherein the signaling system 1 is used by a peer A trying to communicate with a peer B, for example in order to facilitate establishing a direct communication channel between peer A and B using the WebRTC protocol.

The first peer A generates a message intended for the second peer B. Here, the first peer A can be regarded as a source peer, and the second peer B can be regarded as a recipient peer. The message comprises the unique identifier IDB of the recipient peer B. The message comprises a request for a WebRTC connection between the peers A, B.

The source peer A sends the message in the first communication channel established with the signaling system 1. It is further to be noted that the source peer A does not "see" the load balancer L, which acts as a proxy. The message is conveyed in the external subchannel of the first communication channel, then is conveyed in the internal subchannel of the first communication channel, and is thereby received by the first signaling instance S1 of the signaling system 1.

The first signaling instance S1 implements the signaling method described above upon receiving the message. Based on the assumption that the first signaling instance S1 receives the list IDS[ ]=[IDS1, IDS2], the deterministic function F shall output IDS2 as the signaling instance assigned to the recipient peer. Thus, the first signaling instance S1 sends the message to the second signaling instance S2.

The second signaling instance S2 performs as well the signaling method described above. Instance S2 detects that the message comes from another instance (S1). Thus, unlike S1, the second signaling instance S2 directly sends the message in the second communication channel previously established between S2 and the recipient peer B. Peer B is expected to have already previously registered to instance S2, therefore the second communication channel should already exist. If the second communication channel to peer 2 does not exist for some reason (for instance, a network error caused the communication channel to be closed), S2 will register an error (in the form of a textual error log for example) and drop the message.

The message is conveyed in the internal subchannel of the second communication channel, then in the external sub-channel of the second communication channel, and is thereby received by the recipient peer B.

The second peer B processes the request contained in the message. The second peer B can ignore the request or respond to the request. If the second peer B chooses to respond to the request, the second peer B generates a new message intended for the first peer A, the new message comprising the unique identifier of the first peer A and a response to the request contained in the message received by peer B. The second peer B can be regarded as a source peer for the new message and the first peer A as a recipient peer for the new message.

The second peer B sends the new message in the second communication channel. The signaling method described above is carried out by the second signaling instance S2. Thus, upon receiving the new message, the second signaling instance S2 applies the deterministic function F as described above to the unique identifier IDA of the recipient peer A and the list IDS[ ], and function F outputs S1 from this input data, based on the assumption that IDS[ ] has not changed. Thus, the second signaling instance S2 reaches the conclusion that the first signaling instance S1 is in charge of directly sending the new message in a communication channel established with the recipient peer A. The same process as in the previous paragraph when S2 received the message from S1 is carried out as well by the first signaling instance S1 upon receiving the new message sent by the second signaling instance S2. The first signaling instance sends the new message in the first communication channel, then the recipient peer A receives the new message.

The first peer A can then process the response contained in the new message, so as to establish a connection with the second peer B, for instance a WebRTC connection.

In the example above, it was made the assumption that the dataset IDS[ ] received by the signaling instances was always [IDS1, IDS2]. However, it is important to note that the dataset IDS[ ] may be updated by the instance manager M (whenever at least one instance is added or removed). As a consequence, the output of the function F may change, causing a change in the path followed by further messages to be relayed between peers A, B. Nevertheless, even in this case, a message entering system 1 will most of the time end up finding a path to its recipient peer. Most of the time, messages shall be processed by two signaling instances.

It also to be noted that updating the dataset IDS[ ] does not necessarily implies an change in the output of function F. In the example previously described in relation with FIG. 1, the assignment of the first peer A to the first instance S1 did not change after adding the third instance IDS3 in the dataset IDS[ ], as shown by the equations below:

$$F(IDPA, [IDS1, IDS2]) = IDS1$$

$$F(IDPA, [IDS1, IDS2, IDS3]) = IDS1$$

When the function F takes the form of the rendezvous hashing algorithm or the consistent hashing algorithm, the function F will tend to assign peers in an even manner between the instances referred in the dataset IDS[ ]. When the size of IDS[ ] increases (after the addition of at least one new instance), only a fraction representing on average 1/k all the peers will be assigned to a different instance (where k is the number of signaling instances).

The method described above is not limited to the embodiments described above.

For example, step 203 is optional: a given instance may then perform steps 204, 205 wherever the message comes from. As a consequence, an instance may run the deterministic function F even if it has received a message from another instance. This ensures a message will always end up finding a path to its recipient.

The load balancing method performed by the load balancer is an advantageous addition to the signaling method performed by each signaling instance, whenever the system has a variable number of instances. Indeed, the function F may "decide" to reassign a registered peer to a different instance over time, in reaction to a change caused by the instance manager (addition of a new instance, or deletion of a running instance). In this context, the load balancing method ensures that a message will always find its way up to the recipient peer, while keeping the number of created subchannels reasonable and bounded.

The invention claimed is:

1. A method comprising:

obtaining a dataset consisting of respective unique identifiers of signaling instances present in a system at a first time, obtaining a unique identifier of a peer of a peer-to-peer network, selecting a first signaling instance among the signaling instances, by applying a deterministic function to input data, wherein the input data comprises:

the unique identifier of the peer of the peer-to-peer network, and the dataset, establishing a communication channel between the peer of the peer-to-peer network and the system, wherein the communication channel comprises a subchannel between a load balancer and the peer of the peer-to-peer network and a subchannel between the load balancer and the first signaling instance, obtaining an updated dataset consisting of respective unique identifiers of signaling instances present in the system at a second time after the first time, wherein the updated dataset differs at least in part from the dataset, selecting a second signaling instance among the signaling instances, by applying the deterministic function to updated input data, wherein the updated input data comprises:

the unique identifier of the peer of the peer-to-peer network, and the updated dataset, comparing the first signaling instance and the second signaling instance, if the second signaling instance differs from the first signaling instance, updating the communication channel, where the updating comprises:

closing the subchannel between the load balancer and the first signaling instance, and opening a subchannel between the load balancer and the second signaling instance.

2. The method of the claim 1, wherein each subchannel is a Websocket channel.

3. The method of the claim 1, wherein the deterministic function is a rendezvous hashing or a consistent hashing.

4. The method of the claim 1, wherein the deterministic function outputs a unique identifier of the selected signaling instance.

5. The method of the claim 1, wherein the input data consists of the unique identifier of the peer of the peer-to-peer network and of the dataset.

6. A non-transitory computer-readable medium comprising code instructions for causing a computer to perform the method as claimed in claim 1.

* * * * *